(12) United States Patent
Yu et al.

(10) Patent No.: US 9,838,459 B2
(45) Date of Patent: Dec. 5, 2017

(54) ENHANCING DASH-LIKE CONTENT STREAMING FOR CONTENT-CENTRIC NETWORKS

(71) Applicant: Futurewei Technologies, Inc., Plano, TX (US)

(72) Inventors: Yu-Ting Yu, Los Angeles, CA (US); Cedric Westphal, San Francisco, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 267 days.

(21) Appl. No.: 14/701,015

(22) Filed: Apr. 30, 2015

(65) Prior Publication Data

US 2015/0319214 A1    Nov. 5, 2015

Related U.S. Application Data

(60) Provisional application No. 61/986,735, filed on Apr. 30, 2014.

(51) Int. Cl.
G06F 15/16 (2006.01)
H04L 29/08 (2006.01)
H04L 29/06 (2006.01)

(52) U.S. Cl.
CPC .......... *H04L 67/02* (2013.01); *H04L 65/4069* (2013.01); *H04L 65/602* (2013.01); *H04L 65/80* (2013.01); *H04L 67/2847* (2013.01); *H04L 67/327* (2013.01); *H04L 67/10* (2013.01); *H04L 67/28* (2013.01)

(58) Field of Classification Search
CPC ... H04L 67/02; H04L 67/2847; H04L 67/327; H04L 67/10; H04L 67/28; H04L 65/2069; H04L 65/602; H04L 65/80
USPC ........................................................ 709/219
See application file for complete search history.

(56) References Cited

U.S. PATENT DOCUMENTS

| | | | |
|---|---|---|---|
| 2010/0023974 A1* | 1/2010 | Shiragaki | H04N 21/2402 725/58 |
| 2013/0191511 A1* | 7/2013 | Liu | H04L 67/2847 709/219 |
| 2014/0365556 A1* | 12/2014 | Rehan | H04L 65/60 709/203 |

\* cited by examiner

*Primary Examiner* — Wing F Chan
*Assistant Examiner* — Joseph Maniwang
(74) *Attorney, Agent, or Firm* — Vierra Magen Marcus LLP

(57) ABSTRACT

A content controller monitors current network capacity usage and ongoing streaming data requests. Based on the collected information, the content controller assigns a data segment prefetching task to a data storage (e.g., a cache) of the network. One or several caches can be used to prefetch one or more data segments, depending on the network conditions and the speed with which a data store can retrieve the data over the network. The task assignment is performed for a given period of time, which is defined as a round. Periodically, the controller uses information collected from previous rounds, such as the history of streaming data requests and bandwidth usage, to determine the data segments to be prefetched by data stores in the next round.

20 Claims, 5 Drawing Sheets

400

401
receiving a request for media content stored in a network, the media content comprising a plurality of media segments and an associated description file, the network comprising a plurality of nodes

403
determining a location of the media content in the network based on the associated description file

405
determining an available network bandwidth for prefetching media segments of the plurality of media segments at a storage of a node of the network

407
forwarding instructions to the node of the network to prefetch the media segments

Fig. 4

ENHANCING DASH-LIKE CONTENT STREAMING FOR CONTENT-CENTRIC NETWORKS

CROSS-REFERENCE TO RELATED APPLICATIONS

This application claims the benefit of U.S. Provisional Application No. 61/986,735, entitled "ENHANCING DASH-LIKE VIDEO STREAMING USING INFORMATION-CENTRIC NETWORKS," filed on Apr. 30, 2014, the benefit of the earlier filing date of which is hereby claimed under 35 U.S.C. §119(e) and the contents of which are further incorporated by reference in its entirety.

FIELD OF THE INVENTION

Embodiments of the present disclosure generally relate to communication networks. More specifically, embodiments of the present disclosure relate to improving quality of experience for video streaming services over a communication network.

BACKGROUND

According to some estimates, video streaming traffic exceeds 50 percent of the total traffic over content distribution networks (CDNs). In adaptive streaming, when delivering media content to a client device, the client device may select appropriate segments dynamically based on a variety of factors, such as network conditions, device capability, and user choice. For example, the client device may select a segment with the highest quality (e.g., resolution or bit-rate) possible that can be downloaded in time for playback without causing stalling or rebuffering events in the playback. Thus, the client device may seamlessly adapt its media content playback to changing network conditions. One form of adaptive streaming is DASH (Dynamic Adaptive Streaming over Hypertext Transfer Protocol (HTTP)), which is designed to promote efficient delivery of multimedia content from servers to clients through HTTP-based content distribution networks Video streams using DASH (or equivalents such as Apple HLS, Adobe HDS, etc.) exhibit some relatively specific properties. For example: video streams are long lived, ranging from a few minutes for some YOUTUBE™ clips to over an hour for some NETFLIX™ movies; video streams are typically described in a manifest at the onset of the connection, making it possible to know the semantics of the stream ahead of time, and; video streams are predictable in the sense that the sequence of packets is predetermined by the video stream's description and the network conditions. The consumption of video streams exhibits strong daily patterns, with a significant peak during "prime time" hours. From a network operator's perspective, not only will video streaming consume a lot of network resources, it will also require over-provisioning the network for a peak usage that can be much higher than the average. This results in a significant amount of unused capacity for a majority of network operation time.

SUMMARY

Embodiments of the present disclosure provide a content controller that is able to monitor current network capacity usage and ongoing streaming data requests. Based on the collected information, the content controller assigns a data segment prefetching task to a data storage (e.g., a cache) of the network. One or several caches can be used to prefetch one or more data segments, depending on the network conditions and the speed with which a data store can retrieve the data over the network. The task assignment is performed for a given period of time, which is defined as a round. Periodically, the controller uses information collected from previous rounds, such as the history of streaming data requests and bandwidth usage, to determine the data segments to be prefetched by data stores in the next round.

In one aspect, a network device for controlling data streaming over a network includes a transceiver that receives requests and sends responses; a processor coupled with the transceiver; and a memory coupled with the processor, the memory having stored therein instructions that, upon execution by the device, cause the device to perform operations. The operations include receiving a request for media content stored in a network, the media content comprising a plurality of content segments and an associated description file, the network comprising a plurality of nodes; determining a location of the media content in the network based on the associated description file; determining an available network bandwidth for prefetching content segments of the plurality of content segments at a storage of a node of the network; and forwarding instructions to the node of the network to prefetch the content segments.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 depicts a method of prefetching content in a content delivery network, according to an embodiment of the present disclosure.

DETAILED DESCRIPTION

Figure 1:
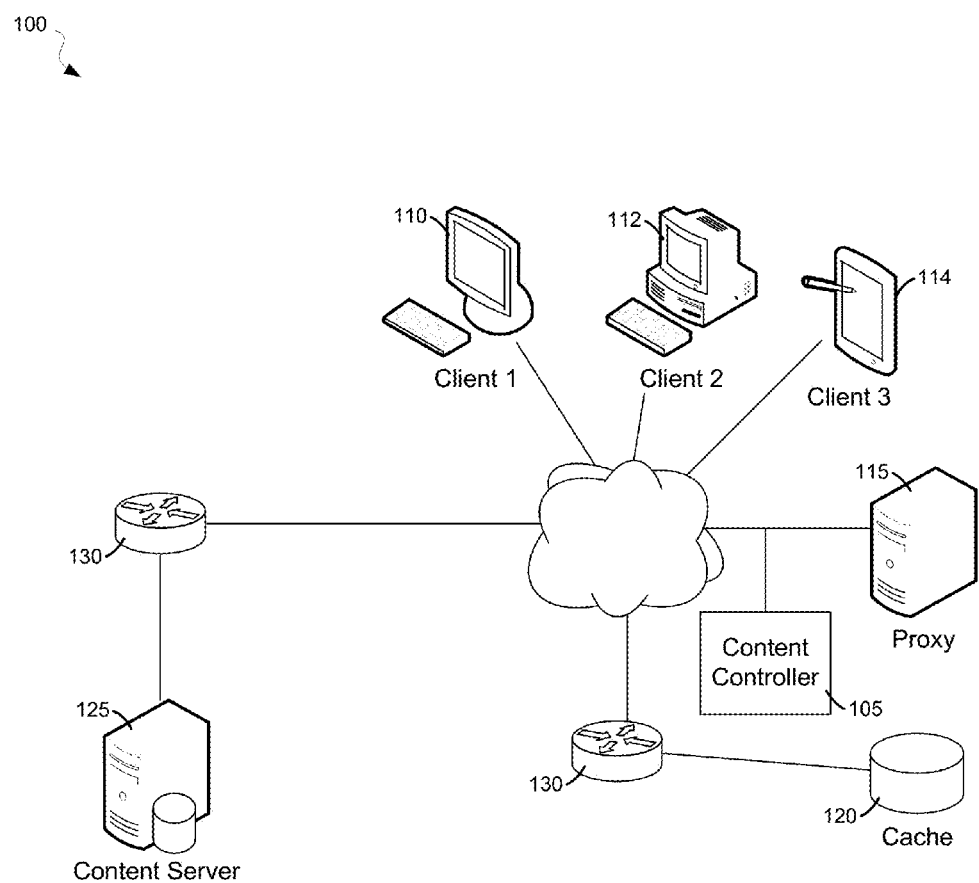
FIG. 1 depicts an exemplary content-centric network topology according to an embodiment of the present disclosure.

When accounted for properly, periodicity (e.g., consistent peak streaming times) can be used to the advantage of a network operator. Predictable peaks (patterns) in traffic, and known durations of data streaming (e.g., video data), permit acceleration of data stream transmission when it commences. When performed in the time window prior to the peak traffic, the data stream can be pre-downloaded (that is, prefetched). A network-aware resource management scheme according to embodiments of the present disclosure improves the quality of experience (QoE) for adaptive data streaming in content-centric networks (for example, CDNs and ICNs) in general, and for DASH in particular. By utilizing metadata of data streams (for example, a DASH manifest), the network (by way of a logically centralized content controller) computes the available link resources and schedules the chunk dissemination to edge caches ahead of the end-user's requests. Operation of the network can be optimized for multi-rate DASH videos, for example.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the term "media content object" refers to any data in any data format, including a document object, a multimedia object, or the like, that can be accessed over a network. The media content object further represents a data format that enables linking to another media content object, including, but not limited to markup language document format (e.g., Hypertext Transfer Language (HTML), Extensible Markup Language (XML), Standard Generalized Markup Language (SGML), Domain Name System (DNS) entry (including responses), or even a non-markup language format (e.g., Object Linking and Embedding (OLE)), Structured Query Language (SQL), or the like.

The term "network connection" refers to a collection of links and/or software elements that enable a computing device to communicate with another computing device over a network. One such network connection may be a TCP/IP connection. TCP/IP connections are virtual connections between two network nodes, and are typically established through a TCP/IP handshake protocol. The TCP/IP protocol is described in more detail in Request for Comments (RFC) 793, and/or RFC 3323, which are available through the Internet Engineering Task Force (IETF), and are each herein incorporated by reference.

For simplicity, embodiments according to the present disclosure may be discussed in the context of DASH, in some instances using DASH terminology. However, it is understood that embodiments according to the present disclosure are not necessarily limited to a DASH implementation, and that the use of DASH terminology does not necessarily limit such embodiments to a DASH implementation. That is, DASH is not a necessary condition for prefetching implementations of the present disclosure; rather, all that is needed is information about the network pattern, and the total file size (e.g., sum of segments). Likewise, embodiments of the present disclosure may be discussed in the context of ICN, in some instances using ICN terminology. However, it is understood that embodiments according to the present disclosure are not necessarily limited to an ICN implementation, and that the use of ICN terminology does not necessarily limit such embodiments to an ICN implementation. Networks architectures according to the present disclosure preferably include pervasive in-network storage, where each node of the network has caching capability.

Embodiments of the present disclosure provide a resource management scheme for improving the quality of experience for data streaming in a content-centric network, for example, a DASH-like video streaming service in an Information-Centric Network (ICN). By utilizing a DASH manifest (e.g., a media presentation description), a content controller of the network computes the residual resources of the network and schedules segment dissemination of a requested data stream to network storage, for example, edge caches, in advance. The process can be optimized for multi-rate DASH videos. According to embodiments of the present disclosure, the network is DASH-aware and provides a way to identify the data streaming contents with different rates (e.g., via the MPD), so that the cache may prefetch higher quality representations of the data stream in advance. The network is able to maintain states of current viewing with prefetching, without adding to the network congestion. A resource allocation of prefetching is implemented having both capacity estimation and scheduling functionality.

In DASH, video content is broken into a sequence of small segments, each containing a short playback time of the video. The DASH client first requests a manifest describing the video and available quality levels, and then adaptively requests the segment with proper video quality based on the current network conditions reflected during the streaming process. Embodiments of the present disclosure improve the capacity utilization of video streaming services and consequently enhance Quality of Experience (QoE). With the use of ICN, unique content naming is possible for data streams. Content naming grants a network the ability to understand the context of the data units. Therefore, it is possible to more broadly leverage prefetching along with the application and network awareness to improve overall bandwidth utilization and network performance, and consequently to achieve more flexible data transfers.

ICN enables two significant features for dynamic video streaming. Firstly, it offers an opportunity to re-name content according to logical semantics, so that one can identify the proper rate and time segment from the naming structure. This allows one to infer the names of future segments without necessarily having access to the manifest of the data stream. Secondly, the file is explicitly requested using this name, letting the network between a client and a server easily identify that a series of packets belongs to a particular data transfer, e.g., a streaming video transfer.

In an ICN, the edge network can infer what a user is streaming, and can derive what the user will request if he/she keeps watching the video stream. The network also has information regarding available network resources, be it either available bandwidth toward the client and the server, or available storage/cache resource distributed within the network.

Combining the knowledge of a user's requests with that of the network resource, a content controller according to the present disclosure can schedule requests for data streams in a manner that maximizes its incentive. According to an embodiment, the content controller determines whether or not to prefetch a data stream that is not currently cached within the network. The determination is based on the current network conditions, the expected variations of the traffic (based, for instance, on daily patterns), the available cache space, etc.

Figure 3:
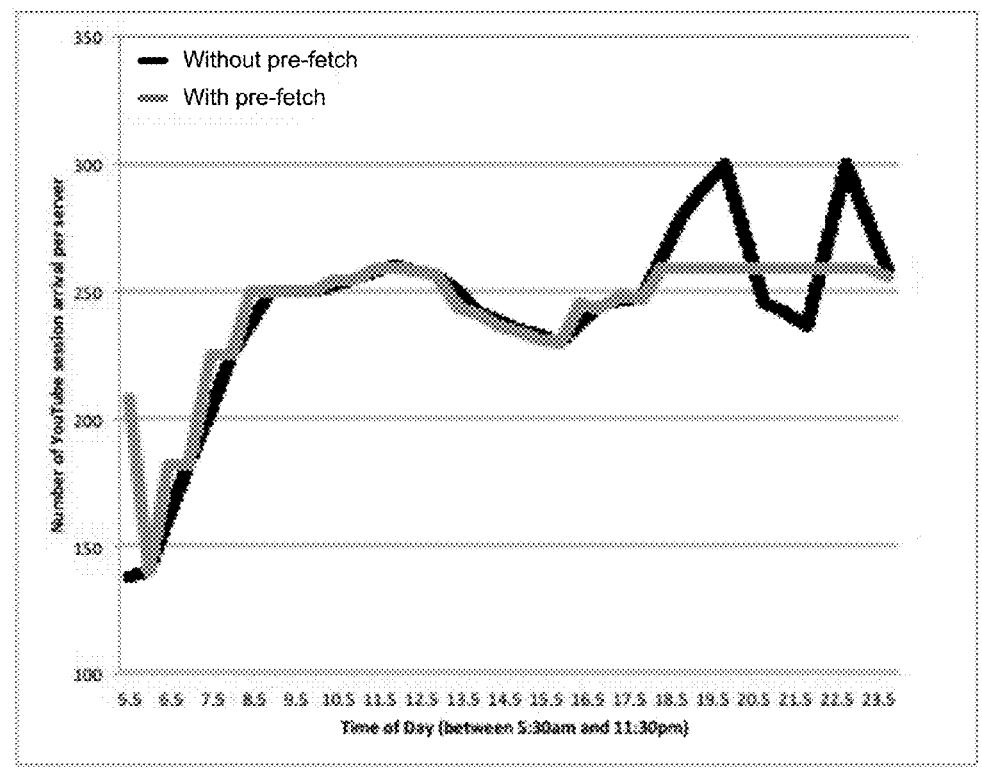
FIG. 3 depicts Internet traffic variation for video streaming service on a typical day, with and without prefetching, according to embodiments of the present disclosure.

It is appreciated that video streaming possesses a high degree of daily variability, with streaming traffic increasing dramatically during prime time hours. Prefetching of data streaming segments provides benefits to a content-centric network. In particular, prefetching enables one to shift some of this traffic in time so as to reduce the peak bandwidth requirements on the network (as shown in FIG. 3, described below).

Referring now to FIG. 1, a content-centric network 100 (e.g., an ICN) can comprise a plurality of network nodes, e.g., routers 130, storage (e.g., cache) 120, proxy server 115, and content server 125, that can be coupled to each other and to a plurality of customer nodes/sites 110-114. The ICN can also comprise an ICN content controller 105, e.g., at a control plane of the ICN. The components of the ICN can be arranged as shown in FIG. 1.

The network nodes can be coupled to each other via network links, e.g., fixed connections. The network nodes can be any nodes, devices, or components that support transportation of traffic, e.g., frames and/or packets, through the ICN. The network nodes can pass the traffic onto or receive the traffic from other nodes in the ICN. The network nodes can comprise a plurality of content servers 125 that store or cache content, which can be provided to users or subscribers, e.g., upon demand. For example, the network nodes can be routers, switches, or bridges, such as backbone core bridges (BCBs), provider core bridges (PCBs), or label switch routers (LSRs).

Additionally, the network nodes can comprise content routers that forward content based on content name prefixes. The content routers can be configured to route, cache, and/or store content. Some of the content routers, e.g., edge nodes, can be coupled to the customer nodes/sites 110-114, e.g., via a plurality of access networks, wired links, or wireless links. The content routers can be edge nodes and possibly core nodes in the ICN that forward content traffic to the customer nodes/sites 110-114 based on a customer request or demand.

The content routers can also receive content requests from the customer nodes/sites 110-114. For example, the content routers can be enhanced versions of traditional routers or bridges, such as backbone edge bridges (BEBs), provider edge bridges (PEBs), or label edge routers (LERs) that forward content based on content name prefixes. From a transport perspective, the roles of these nodes can be the same (even for backward compatibility), but more importantly they can be enabled for content distribution through features like dynamic/persistent caching, and application level assistance. These content routers can also be functional content-centric network routers or content routers based on other proposals, in which case the goal of content dissemination is ingrained in the transportation layer. The ICN can be a combination of such enhanced content routers, traditional router/switches, or a combination thereof.

The customer nodes/sites 110-114 can be nodes, devices, or components configured to deliver content to and receive content requests from the users or user applications. For instance, the customer nodes can be fixed or mobile user-oriented devices, such as desktop computers, notebook computers, personal digital assistants (PDAs), or cellular telephones. Alternatively, the customer nodes/sites 110-114 can be connectivity devices at customer premises, such as modems or set-top boxes. The customer nodes/sites 110-114 can also comprise customer equipment (not shown) that can be configured to receive content from the ICN, e.g., via access networks, and distribute the content to a plurality of customers. For instance, the customer nodes/sites 110-114 can comprise optical network terminals (ONUs) and/or very high bit rate Digital Subscriber Line (VDSL) transceiver units at residential locations (VTU-Rs). The access networks can be any networks that provide access to the content in the content-centric network 100, such as Virtual Private Networks (VPNs). The customer nodes/sites 110-114 can also comprise service stations such as application servers.

At least some of the customer nodes/sites 110-114 can be mobile devices that can be coupled to the network nodes, e.g., edge nodes, via wireless links. The customer nodes/sites 110-114 can publish (push) and/or subscribe or request (pull) content in the ICN. The customer nodes/sites 110-114 can correspond to users and/or user applications. The users can be publishers, subscribers, Enterprises (e.g., Healthcare, Financial, Insurance, Movie studios, etc.), Social Networks, Governments, First Responder networks, Sensor Networks, Data Transmission Networks, Mobile-to-Mobile (M2M) networks, other content user types, or combinations thereof. The ICN can provide a plurality of services to the customer nodes/sites 110-114, including content publishing/subscribing or requesting, content cashing/storing, customer mobility support, security, and/or other content oriented services.

The content controller 105 can be a control plane entity that monitors the current network bandwidth and network data rates as requested data is transmitted back to the client. In order to retrieve data stream information, the content controller 105 can obtain media presentation description (MPD) information by explicitly requesting the MPD from the server.

In an embodiment of the present disclosure, the content controller 105 performs two tasks at the beginning of each round: residual capacity estimation, which is an estimate of the capacity for the next round of data streaming and includes a determination of how much spare capacity is available for use by prefetching; and, segment scheduling, which compiles a list of video segments to prefetch based on the data streaming information, request history and the existing contents stored in caches of the network.

According to embodiments of the present disclosure, segment prefetching scheduling occurs periodically. To schedule prefetching tasks, the content controller 105 computes the available capacity for prefetching according to collected network context and projected future requests, and compiles a list of segment identifiers to prefetch for caches. The segment identifier list is then sent to the caches. Upon receiving a segment identifier list, a cache initiates a request (e.g., DASH HTTP request) for each specified segment to the server in order to fetch the segments listed one-by-one. A segment, once received by a cache, prompts a notification to be sent to the content controller 105 so that the content controller 105 can maintain the sources of contents. Note that according to embodiments of the present disclosure caches may support lower video rates by transcoding the retrieved segments to lower rate ones offline.

Embodiments of the present disclosure provide a data streaming prefetching approach that takes into account both data streaming session context and network condition context. In an embodiment, the ICN framework ContentFlow is utilized. ContentFlow implements the management and policy at the content level in an ICN, using OpenFlow. As an example, uniform resource locators (URLs) can be used as data names. Content controller 105 is used to assign contents to caches on the path from the client to server and maintain the content state and location. A proxy is utilized to maintain the connection from the client (e.g., a TCP connection) and interacts with the content controller 105 to perform content routing.

In an embodiment, the content controller 105 collects statistics of current network capacity usage and ongoing data streaming processes (e.g., DASH video sessions). Based on the collected information, the content controller 105 assigns data segment prefetching tasks to caches in the network, for example, to edge caches. The task assignment is performed for a given period of time, which may be defined as a round. Periodically, the content controller 105 uses knowledge collected from the previous rounds, such as the history of DASH video segment requests, along with the bandwidth usage, in order to determine segments to be prefetched by caches in a next round.

Residual Capacity Estimation

Given the current total capacity of the network, $C_{total}$, the amount of capacity that is anticipated to be consumed by clients, $B_{client}$, and the length of a round, W, the bandwidth available to prefetching at a cache, $B_A$, can be defined as follows:

$$B_A = \max\left(C_{total}\delta - \frac{B_{client}}{W}, 0\right) \quad (1)$$

where $\delta$ is a pre-defined threshold preserved for traffic bursts. To estimate the capacity consumed by network clients, considering $B_{new}$ as the amount of bandwidth consumed by newly arriving data streaming sessions in the next round, and $B_{old}$ as the amount of bandwidth consumed by current video sessions in the next round, $B_{client}$ can be represented as:

$$B_{client} = B_{new} + B_{old} \quad (2)$$

Assuming a Poisson arrival process of data streams, the content controller 105 can formulate $B_{new}$ as a function of the initial request arrival rate of data streams. However, the computation of $B_{old}$ requires knowledge about the data stream (e.g., DASH video) as well as cached contents in the network. Therefore content controller 105 is operable to differentiate the segments that can be retrieved from caches and the segments only available on the original server (e.g., content server 125).

The content controller 105 first determines which segments will be retrieved by the client in a next round. The next round retrieval may be formulated as a function of the last segment retrieved by a client and the number of segments to be requested in the next round. The information of the requested segments can be readily maintained by content controller 105 monitoring the data streaming requests. However, predicting the identifier of future segments requires some knowledge of the available segments and the behavior of the streaming service client. For example, commercial video streaming services allow a video player to buffer only a fixed amount of data, in the unit of seconds or minutes, at any given time. Subsequent segments are only requested by the video player when equivalent playback has been consumed. In such cases, an approximately uniform DASH request arrival for each client may be expected once that client's playback buffer becomes full. Prior to this, a client continues to request the next segments in order to fill up the buffer. More formally speaking, the number of segments to be requested by a client in the next round ($N_{req}$) can be described by:

$$N_{req} = s_m - s_b + \frac{W}{s_t} \quad (3)$$

where $s_m$ is the maximum buffer size in the unit of seconds, $s_b$ is the current buffer size of the client, and $s_t$ is the playback time of a segment in seconds. With a knowledge of last requested segment, the content controller 105 examines the next $N_{req}$ segments and determines how many are already cached. If these segments are not cached yet at the time of scheduling commencement, the segments will be requested from the server. Additionally, the additional amount of bandwidth required for these segments is added to the anticipated network load $N_i$ for a client i. $B_{old}$ can be estimated as:

$$B_{old} = \sum_i N_i s_{v,i} \quad (4)$$

where $s_{v,i}$ is the size of data segments (e.g., video segments) in bytes. $B_{old}$ is calculated in a conservative way. That is, clients are assumed to request the highest quality segment and the segment size $s_{v,i}$ is approximated accordingly. This can be readily extended to a finer $s_{v,i}$ approximation on the controller side with knowledge of rate adaptation mechanism used by clients.

Segment Prefetching Scheduling

Once the residual capacity available for the cache is determined, the content controller 105 makes a determination of which segments to prefetch. The principle of the scheduling process may be explained by way of an example with a single client. For simplicity, in an embodiment an assumption is made that the cache-server path is able to sustain the highest data transfer rate (e.g., high quality video bitrate). Suppose each segment represents one second of a video and that the client's last request was for segment 2, and that the round length is 5 seconds. Therefore, the expectation is that the client will retrieve segment 3 to segment 7 in the next round. Assuming the cache does not have segment 3 to segment 7, the client will request the segments directly from the server. In this case, in order to prevent bandwidth waste (e.g., the cache prefetching the same segment as the client), the cache must prefetch segments after segment 7, that is, starting from segment 8. In this case, the content controller 105 can calculate the expected number of segments to prefetch ($N_p$) by:

$$N_p = B_A W \quad (5)$$

That is, in this example the cache will prefetch segment 8 to 8+$N_p$. Assuming segments 3 to 15 have been prefetched by the cache, the client will obtain these segments from the cache in the next round, and the cache will continue prefetching segments 16 to 16+Np. According to embodiments of the present disclosure, only those segments that have not been cached or played are scheduled for prefetching.

In an embodiment, a generalized solution supports multiple data streaming segment qualities (e.g., video rates) and various network conditions. Consider a case when the cache-server path cannot always sustain the highest video rate, for example a highest video rate is 1 Mbps but the residual bandwidth available for prefetching is only 700 kbps. A determination is made by the content controller 105 as to whether the highest quality segment will be fetched. In the case with a single client, the earliest playback time among all segments awaiting prefetching is T, the data rate is R, the approximate segment size at rate r is $s_r$, the time the prefetching of segment i starts is $t_i$, higher quality segments are prefetched as long as the following holds:

$$T > \frac{R}{s_r} + t_i \quad (6)$$

In other words, the controller selects the video rate r by:

$$\operatorname*{argmax}_{r} \frac{R}{s_r} + t_i - T \quad (7)$$

Note that in this case the content controller 105 is able to schedule fewer than $N_p$ segments as it can only schedule those segments that satisfy $t_i$<T.

In another embodiment storage of the network is able to prefetch for multiple clients (e.g., clients requesting different videos). By the same principle, the content controller 105 can determine for each client from which segment to start. The content controller 105 can prioritize segments, and then take at most first $N_p$ segment accordingly. In an embodiment, fairness between clients is not considered and the segments are simply ordered by their estimated playback time, for example, the time a particular video segment will be needed. This time is estimated at the content controller 105 using the recorded requested time of the first segment request from a client, the duration of segments, and the order of the segment in the data stream. The duration and order of segments can be available in metadata, for example metadata carried by the MPD of DASH videos. If the residual capacity of the network $B_A$ can sustain highest quality among all data streams, the content controller 105 selects the $N_p$ segments with the earliest estimated playback time in the list to prefetch. In a case when the residual capacity $B_A$ does not necessarily sustain all rates, equation (7) can be used to determine which rate should be requested. Note that prefetching a higher quality segment for one client does not affect the normal playback of other clients, as the end time of each prefetching is limited to before T by equation (7). In addition, the capacity needed to sustain normal playback of all clients during the next round has been included in equation (4).

Figure 2:
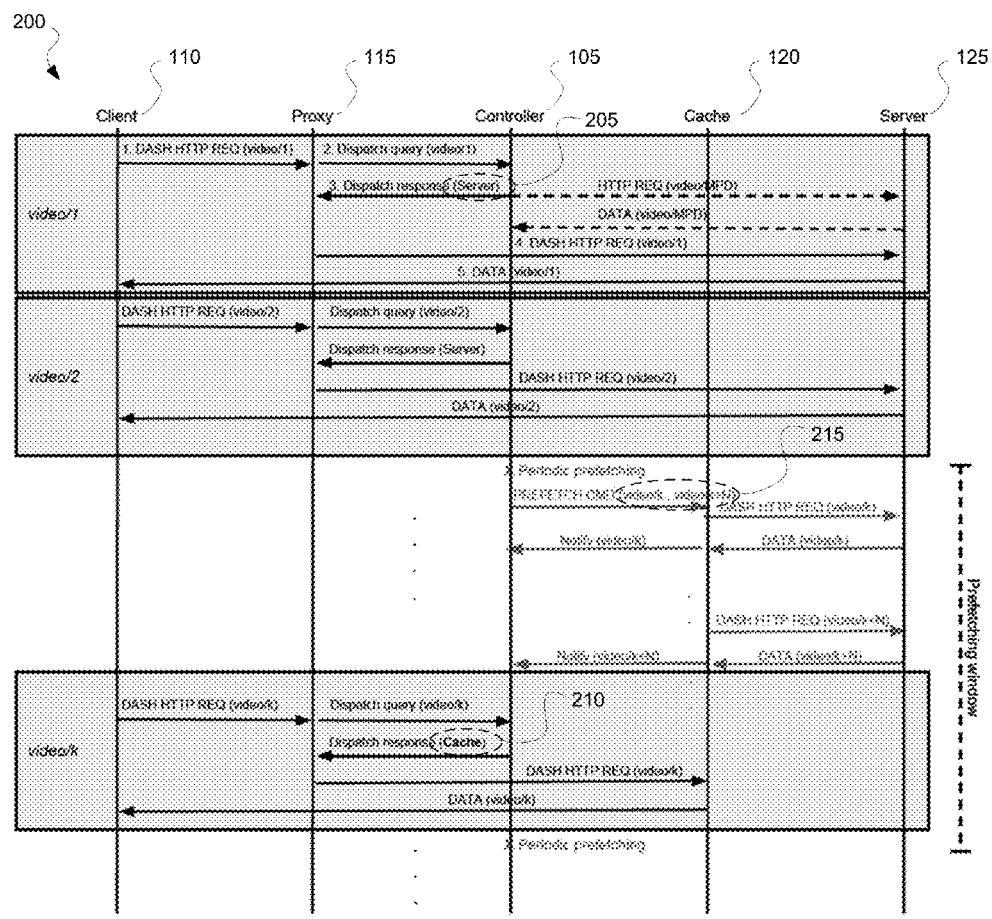
FIG. 2 depicts a protocol message exchange according to an embodiment of the present disclosure.

Referring now to FIG. 2, a protocol message exchange protocol 200 is depicted according to an embodiment of the present disclosure. In one embodiment a proxy (e.g., proxy 115) is used to dispatch HTTP requests. To dispatch HTTP requests to a storage in a content-centric network (e.g., cache 120) or a server (e.g., content server 125), the proxy queries a content controller (e.g., content controller 105) to determine whether the content is cached (that is, prefetched) or is maintained by the server. The controller, monitoring the data request, collects and maintains the segments of the one or more data streams (e.g., video segments) that each client is requesting. This can be done, for example, by parsing the query from the client to the content-centric network. Requests are then forwarded by the proxy to the server, or cache, as appropriate.

Protocol 200 includes an exemplary transaction in streaming network with pre-fetching. A first step of a transaction is to receive a DASH manifest from the server. By inspecting the manifest (by the content controller), available rates for media content streaming from the server can be detected, as well as any prior requests that have been made to the server. This provides knowledge of potential buffering at client, for example using Equations 1-7 described above. In particular, the content controller has knowledge of which segments have been requested, as well as the amount of time that has elapsed since the beginning of the stream, and it can therefore compute prefetching that has been completed and prefetching that is still possible. According to embodiments of the present disclosure, the content controller can be collocated with a cache, or a proxy, or can be a standalone system.

A client can issue a request for media content, for example an HTTP request, to the proxy. The proxy forwards the request to the controller, which transmits a response to the proxy. In parallel, the controller makes a request of media content metadata (e.g., a DASH video MPD) from the server. The server forwards the metadata to the controller. The proxy then requests the first media content segment from the server, and the server sends the data to the client.

According to embodiments of the present disclosure, the content controller determines a prefetching status of the requested media content. If the controller determines that the requested media content is not cached locally, a response 205 indicates that the requested media content will be accessed from the server (e.g., content server 125). If however the media content is local, a controller response 210 indicates that the media content will be retrieved from a storage of a node in the network (e.g., cache 120).

In addition to determining prefetching status of media content in the content-centric network, the content controller can initiate prefetching tasks 215 for one or more storage locations (e.g., cache) in the network. According to embodiments, a cache can have stored one or more segments of the requested media content, and the content controller is aware that the client is requesting these stored segments, along with the available bandwidth in the network. The number of segments that are prefetched is variable, and can be determined according to Equation 5. Additionally, for segments that have more than one representation (e.g., have different quality, as specified in the metadata), the prefetching tasks 215 commanded by the controller can specify the particular quality representation to prefetch according to Equations 6 and 7. For example the client can adapt video quality by a moving average of the data rate estimates of previous segments. This allows the video quality adaptation to be more responsive, but also avoids unnecessary quality fluctuation. The prefetching can occur in rounds, with server returning as many segments to the cache as are requested. The cache notifies the controller that the segments are received. So, when the media content video 'k' is requested by the client, the controller responds that the segment is in the cache, and the proxy requests the segment from the cache, which returns the data to the client.

Referring now to FIG. 3, Internet traffic variation for a video streaming service on a typical day is depicted, with and without prefetching. The black curve indicates a number of sessions per server without prefetching, and the gray curve indicates a number of sessions per server with prefetching. Note the peak of the curves, which occurs near 8:00 p.m. without prefetching, and is flattened and shifted to the left (e.g., earlier time of day) with prefetching. As shown, prefetching reduces the peak bandwidth usage, with the time saving at busy hours (evening 3 pm to 8 pm) for both data sets being roughly 15%. A network operator can possibly reduce operation costs incurred by extra usage without prefetching, or use the residual to serve other types of traffic. From a user's point of view (e.g., a client), the increased available bandwidth of the streaming service can be used to improve streaming experience, for example, by having a higher quality video streamed with the available capacity.

FIG. 4 is a flowchart 400 of an example of a computer-implemented method of prefetching content in a content delivery network, according to an embodiment of the present disclosure. The flowchart 400 can be implemented as computer-executable instructions residing on some form of non-transitory computer-readable storage medium. The operations of the flowchart 400 can be implemented by content controller 105. Although described using a single instance of media content as an example, the operations can be readily extended to multiple instances of media content.

In block 401 of FIG. 4, a content controller of a network receives a request for media content stored in a network, the media content including a plurality of media segments and an associated description file, the network including a plurality of nodes. The media content can be, for example, video content for streaming, which can included a number of video segments having several representations of different quality.

In block 403, the content controller determines a location of the media content in the network based on the associated description file. The media content can be located at any node in a content-centric network, including a content server or a storage node (e.g., a cache). According to embodiments of the present disclosure, the network can be an ICN having pervasive storage, that is, storage at each node in the network.

In block 405 the content controller determines an available network bandwidth for prefetching media segments of the plurality of media segments at a storage of a node of the network. The network bandwidth can include a measure of the current bandwidth consumed by clients in one or more streaming processes. The bandwidth measure can include an estimate of future bandwidth consumption, based on knowledge of current media content streams, client history, network history (e.g., daily patterns in traffic), etc.

In block 407 the content controller forwards instructions to the node of the network to prefetch the media segments. The node can be a storage node including a cache, and the cache can prefetch one or more segments of the media content. The specific segments, and their number, can be prefetched according to the location of segments in the network, the rate of media consumption, the duration of the media content (e.g., playback time), etc.

Figure 5:
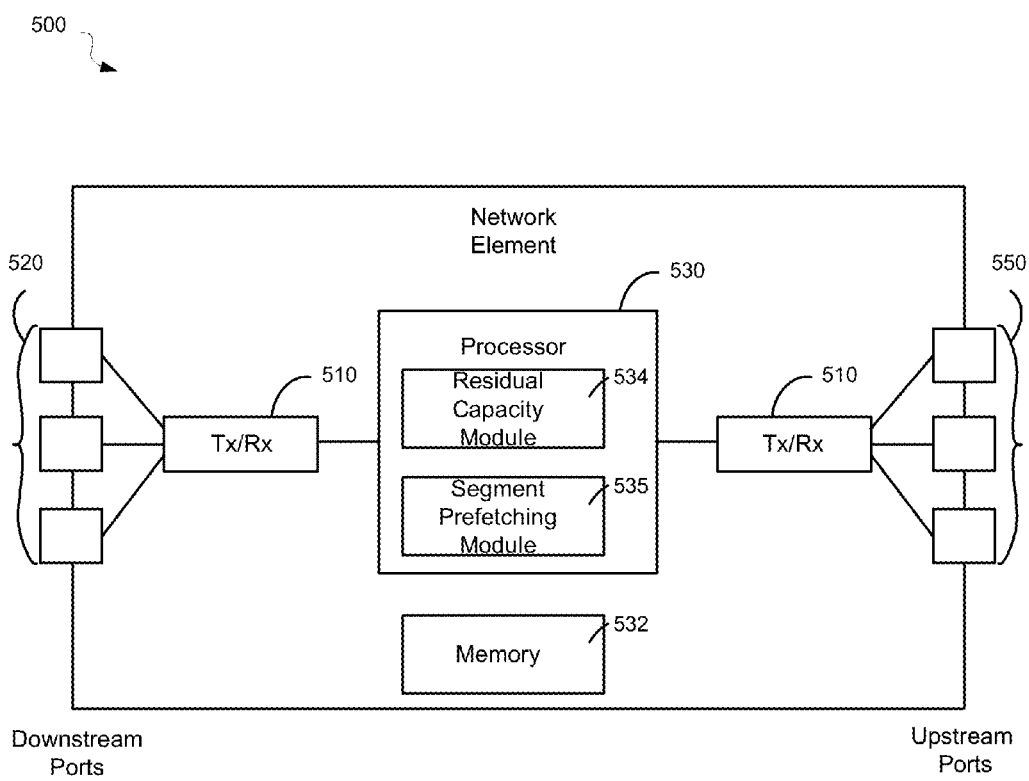
FIG. 5 depicts a schematic diagram of a network element, according to an embodiment of the present disclosure.

FIG. 5 is a schematic diagram of an embodiment of a network element (NE) 500 which can act as a network controller, such as content controller 105, within a network such as network 100, and can be configured to estimate residual capacity of a network and to prefetch segments of streaming data in the network. NE 500 can be implemented in a single node or the functionality of NE 500 can be implemented in a plurality of nodes in an ICN, a CDN, or other content-centric network. In some embodiments NE 500 can also act as other node(s) in network 100. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments. At least some of the features/methods described in the disclosure can be implemented in a network apparatus or component such as an NE 500. The NE 500 can be any device that transports frames through a network, e.g., a switch, router, bridge, server, a client, etc. As shown in FIG. 5, the NE 500 can comprise transceivers (Tx/Rx) 510, which can be transmitters, receivers, or combinations thereof. A Tx/Rx 510 can be coupled to a plurality of downstream ports 520 (e.g. downstream interfaces) for transmitting and/or receiving frames from other nodes and a Tx/Rx 510 coupled to plurality of upstream ports 550 (e.g. upstream interfaces) for transmitting and/or receiving frames from other nodes, respectively. A processor 530 can be coupled to the Tx/Rxs 510 to process the frames and/or determine which nodes to send frames to. The processor 530 can comprise one or more single- or multi-core processors and/or memory devices 532, which can function as data stores, caches, buffers, etc. Processor 530 can be implemented as a general processor or can be part of one or more application specific integrated circuits (ASICs) and/or digital signal processors (DSPs). Processor 530 can comprise a residual capacity module 534 and/or a segment prefetching module 535. The residual capacity module 534 can determine and forward the capacity of data stores in the network (e.g., caches) available for prefetching a client data stream upon request. The segment prefetching module 535 can determine which data streaming segments to prefetch for a client data stream, and forward segment storage instructions to one or more network storage locations, upon request. In an alternative embodiment, the residual capacity module 534 and/or a segment prefetching module 535 can be implemented as instructions stored in memory 532, which can be executed by processor 530. In another alternative embodiment, the residual capacity module 534 and the segment prefetching module 535 can be implemented on separate NEs. The downstream ports 520 and/or upstream ports 550 can contain electrical and/or optical transmitting and/or receiving components.

It is understood that by programming and/or loading executable instructions onto the NE 500, at least one of the processor 530, residual capacity module 534, segment prefetching module 535, downstream ports 520, Tx/Rxs 510, memory 532, and/or upstream ports 550 are changed, transforming the NE 500 in part into a particular machine or apparatus, e.g., a single- or multi-core forwarding architecture, having the novel functionality taught by the present disclosure. It is fundamental to the electrical engineering and software engineering arts that functionality that can be implemented by loading executable software into a computer can be converted to a hardware implementation by well-known design rules.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments of the present disclosure are thus described. While the present disclosure has been described in particular embodiments, it should be appreciated that the present disclosure should not be construed as limited by such embodiments, but rather construed according to the following claims.

What is claimed is:

1. A network device for controlling data streaming over a network, comprising:
a transceiver that receives requests and sends responses;
a non-transitory memory comprising instructions; and
one or more processors in communication with the memory and the transceiver, wherein the one or more processors execute the instructions to:
receive a request for media content comprising a plurality of content segments and an associated description file,
determine a location of the media content based on the associated description file,
determine an estimated prefetch available network bandwidth for prefetching content segments of the plurality of content segments, wherein the executing the instructions is performed in a period of time defined as a round, and wherein determining the estimated prefetching available network bandwidth comprises estimating bandwidth consumption in a next round, and
forward instructions to prefetch the content segments.

2. The network device according to claim 1, wherein the determining the estimated prefetching available network bandwidth further comprises determining bandwidth consumed in a current round.

3. The network device according to claim 2, wherein the estimated prefetching available network bandwidth is equal to total network bandwidth less a sum of the bandwidth consumed in the current round and the estimated bandwidth consumed in the next round.

4. The network device according to claim 2, wherein the estimated bandwidth consumed comprises an expected variation in network traffic based on a time of day.

5. The network device according to claim 1, wherein the prefetching is at an edge node, where an edge node is a node of the network that is adjacent along a network path to a client device making the request.

6. The network device according to claim 1, wherein a node of the network comprises a respective storage for caching segments.

7. The network device according to claim 1, further comprising the one or more processors executing the instructions to determine a number of content segments of the plurality of content segments to prefetch, based on a storage size of a node of the network and a playback time of the media content.

8. A computer-implemented method of prefetching data in a streaming service implemented in a network device, the method comprising:
receiving a request for media content stored in a network, the media content comprising a plurality of content segments and an associated description file, the network comprising a plurality of nodes;
determining a location of the media content in the network based on the associated description file;
determining an estimated prefetching available network bandwidth for prefetching content segments of the plurality of content segments at a storage of a node of the network, wherein the estimated prefetching available network bandwidth is based on a total network bandwidth less a sum of bandwidth consumed over a current period of time and estimated bandwidth consumed in a next period of time; and
forwarding instructions to the node of the network to prefetch the content segments.

9. The computer-implemented method according to claim 8, wherein the method is performed in a period of time defined as a round, and wherein the determining the estimated prefetching available network bandwidth comprises determining bandwidth consumed in a current round and estimating bandwidth consumption in a next round.

10. The computer-implemented method according to claim 9, wherein the estimated prefetching available network bandwidth is equal to total network bandwidth less the sum of the bandwidth consumed in the current round and the estimated bandwidth consumed in the next round.

11. The computer-implemented method according to claim 9, wherein the estimated bandwidth consumed comprises an expected variation in network traffic based on a time of day.

12. The computer-implemented method according to claim 8, wherein the prefetching is at an edge node, where an edge node is a node of the network that is adjacent along a network path to a client device making the request.

13. The computer-implemented method according to claim 8, wherein each node of the network comprises a respective storage for caching segments.

14. The computer-implemented method according to claim 8, further comprising determining a number of content segments of the plurality of content segments to prefetch, based on a storage size of the node of the network and a playback time of the media content.

15. A device for controlling video streaming in a content-centric network, comprising:
   a transceiver that receives requests and sends responses;
   a non-transitory memory storage comprising instructions; and
   one or more processors in communication with the memory, the one or more processors coupled with the transceiver, wherein the one or more processors execute the instructions to perform:
   receiving a request for video content stored in a content-centric network, the video content comprising a plurality of video segments and an associated description file, the content-centric network comprising a plurality of nodes;
   determining a location of the video content in the content-centric network based on the associated description file;
   determining an estimated prefetching available network bandwidth for prefetching video segments of the plurality of video segments at a storage of a node of the content-centric network, wherein the estimated prefetching available network bandwidth is based on bandwidth consumed over a current period of time and estimated bandwidth consumed in a next period of time; and
   forwarding instructions to the node of the content-centric network to prefetch the video segments.

16. The device according to claim 15, wherein the executing the instructions is performed in a period of time defined as a round, and wherein the determining the estimated prefetching available network bandwidth comprises determining bandwidth consumed in a current round and estimating bandwidth consumption in a next round.

17. The device according to claim 16, wherein the estimated prefetching available network bandwidth is equal to total network bandwidth less a sum of the bandwidth consumed in the current round and the estimated bandwidth consumed in the next round.

18. The device according to claim 16, wherein the estimated bandwidth consumed comprises an expected variation in network traffic based on a time of day.

19. The device according to claim 16, wherein the period of time for a round is selected from a range, the range from 1-20 seconds.

20. The device according to claim 15, wherein the video segments to be prefetched in the next period of time are stored in a storage of a second node.

* * * * *